US010792561B2

(12) United States Patent
Nishimaki et al.

(10) Patent No.: US 10,792,561 B2
(45) Date of Patent: Oct. 6, 2020

(54) INFORMATION PROCESSING SYSTEM, INFORMATION PROCESSING APPARATUS, CONTROL METHOD, AND PROGRAM

(71) Applicant: SONY INTERACTIVE ENTERTAINMENT INC., Tokyo (JP)

(72) Inventors: Yoichi Nishimaki, Kanagawa (JP); Yasushi Okumura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/341,628

(22) PCT Filed: Oct. 18, 2017

(86) PCT No.: PCT/JP2017/037733
§ 371 (c)(1),
(2) Date: Apr. 12, 2019

(87) PCT Pub. No.: WO2018/079384
PCT Pub. Date: May 3, 2018

(65) Prior Publication Data
US 2019/0358526 A1    Nov. 28, 2019

(30) Foreign Application Priority Data

Oct. 28, 2016 (JP) .................................. 2016-212080

(51) Int. Cl.
*A63F 13/24* (2014.01)
*A63F 13/214* (2014.01)
(Continued)

(52) U.S. Cl.
CPC ............ *A63F 13/214* (2014.09); *A63F 13/23* (2014.09); *A63F 13/24* (2014.09); *G06F 3/0447* (2019.05)

(58) Field of Classification Search
CPC .......... G06F 3/014; G06F 3/017; A63F 13/24; A63F 13/214
See application file for complete search history.

(56) References Cited

U.S. PATENT DOCUMENTS

| | | | |
|---|---|---|---|
| 6,515,669 B1 | 2/2003 | Mohri | |
| 6,701,296 B1 * | 3/2004 | Kramer | ............... A61B 5/6806 370/545 |

(Continued)

FOREIGN PATENT DOCUMENTS

| | | | |
|---|---|---|---|
| JP | 2000-132305 A | 5/2000 |
| JP | 2006-276651 A | 10/2006 |

(Continued)

OTHER PUBLICATIONS

International Search Report and Written Opinion dated Jan. 9, 2018, from International Application No. PCT/JP2017/037733, 8 sheets.

(Continued)

*Primary Examiner* — David L Lewis
*Assistant Examiner* — Robert E Mosser
(74) *Attorney, Agent, or Firm* — Katten Muchin Rosenman LLP

(57) ABSTRACT

An information processing apparatus is connected to a device fixed to a hand of a user, the device including a finger position sensor configured to detect a direction of a fingertip regarding one of an index finger, a middle finger, a ring finger, and a little finger of the hand of the user. The information processing apparatus acquires, on the basis of the direction of the fingertip regarding the one of the index finger, the middle finger, the ring finger, and the little finger detected by the finger position sensor and received from the device, information regarding an angle between the finger and a finger adjacent to the finger and estimates, on the basis of a result of the acquisition, an angle between respective (Continued)

fingers of the index finger, the middle finger, the ring finger, and the little finger of the hand of the user.

6 Claims, 5 Drawing Sheets

(51) Int. Cl.
    *A63F 13/23*       (2014.01)
    *G06F 3/044*     (2006.01)

(56) References Cited

U.S. PATENT DOCUMENTS

| | | | |
|---|---|---|---|
| 9,477,310 B2 * | 10/2016 | Cherradi El Fadili | ................. G06F 3/017 |
| 10,391,400 B1 * | 8/2019 | Mucha | ................. A63F 13/214 |
| 2007/0252821 A1 * | 11/2007 | Hollemans | ............ G06F 3/0488 345/173 |
| 2014/0098018 A1 * | 4/2014 | Kim | ................. G06F 3/014 345/156 |
| 2017/0189798 A1 * | 7/2017 | Rogoza | ................. G06F 3/02 |
| 2018/0067545 A1 * | 3/2018 | Provancher | ............. G06F 3/044 |
| 2018/0099219 A1 * | 4/2018 | Hope | ................. A63F 13/24 |

FOREIGN PATENT DOCUMENTS

| | | |
|---|---|---|
| JP | 2014-225145 A | 12/2014 |
| WO | 2016/038953 A1 | 3/2016 |

OTHER PUBLICATIONS

International Preliminary Report on Patentability dated May 9, 2019, from International Application No. PCT/JP2017/037733, 11 sheets.

\* cited by examiner (a)

(c)

(e)

(b)

(d)

(f)

(a)

(b) 
| ANGLE | 15° |
|---|---|
| MIDDLE FINGER | 8 |
| RING FINGER | 8 |
| LITTLE FINGER | 8 |
| DISTANCE | |

(c)

(d)
| ANGLE | 15° |
|---|---|
| MIDDLE FINGER | 8 |
| RING FINGER | 0 |
| LITTLE FINGER | 0 |
| DISTANCE | |

(e)

(f)
| ANGLE | 0° |
|---|---|
| MIDDLE FINGER | 8 |
| RING FINGER | 0 |
| LITTLE FINGER | 0 |
| DISTANCE | |

INFORMATION PROCESSING SYSTEM, INFORMATION PROCESSING APPARATUS, CONTROL METHOD, AND PROGRAM

TECHNICAL FIELD

The present invention relates to an information processing system, an information processing apparatus, a control method, and a program.

BACKGROUND ART

In an information processing apparatus such as a home game device, a controller for controlling operations etc. of a character in a virtual space has been widely used.

In recent years, it is also conceivable that an operation of bending and stretching each finger of a user or an operation of changing an angle between fingers (operation of parallelizing fingers mutually or opening fingers) is detected and an operation of a character is controlled.

SUMMARY

Technical Problem

However, when the operation of bending and stretching each finger or the operation of changing the angle between fingers of the user is to be detected, a sensor that detects the above operations is required to be provided in each finger and costs are increased.

The present invention has been made in view of the above circumstances. An object of the present invention is therefore to provide an information processing system, information processing apparatus, control method, and program capable of suppressing an increase in costs.

Solution to Problem

The present invention for solving the problem of the conventional example described above is an information processing apparatus connected to a device fixed to a hand of a user, the device including a finger position sensor configured to detect a direction of a fingertip regarding one of an index finger, a middle finger, a ring finger, and a little finger of the hand of the user. The information processing apparatus includes: acquisition means configured to acquire, on the basis of the direction of the fingertip regarding the one of the index finger, the middle finger, the ring finger, and the little finger detected by the finger position sensor and received from the device, information regarding an angle between the finger and a finger adjacent to the finger; and estimation means configured to estimate, on the basis of a result of the acquisition, an angle between respective fingers of the index finger, the middle finger, the ring finger, and the little finger of the hand of the user. The information processing apparatus subjects the information regarding the estimated angle between the respective fingers of the hand of the user to predetermined processing.

Advantageous Effect of Invention

According to the present invention, an increase in costs can be suppressed.

DESCRIPTION OF EMBODIMENT

An embodiment of the present invention will be described with reference to the accompanying drawings. Note that, in the following descriptions, a size, ratio thereof, arrangement of each portion, or the like is an example. An example of the present embodiment is not limited to the size, ratio, or arrangement illustrated in the figures.

An information processing apparatus 1 according to the embodiment of the present invention is a computer device such as a home game device and a controller device 20 is connected to the information processing apparatus 1.

The controller device 20 is mounted on and fixed to a left hand or right hand of a user. In the following description, in a case where the controller device 20 fixed to the left hand of the user and the controller device 20 fixed to the right hand of the user need to be discriminated from each other, letters L and R are added to the respective reference signs of the controller devices so that the controller device 20 fixed to the left hand of the user is referred to as a controller device 20L and the controller device 20 fixed to the right hand of the user is referred to as a controller device 20R.

Figure 1:
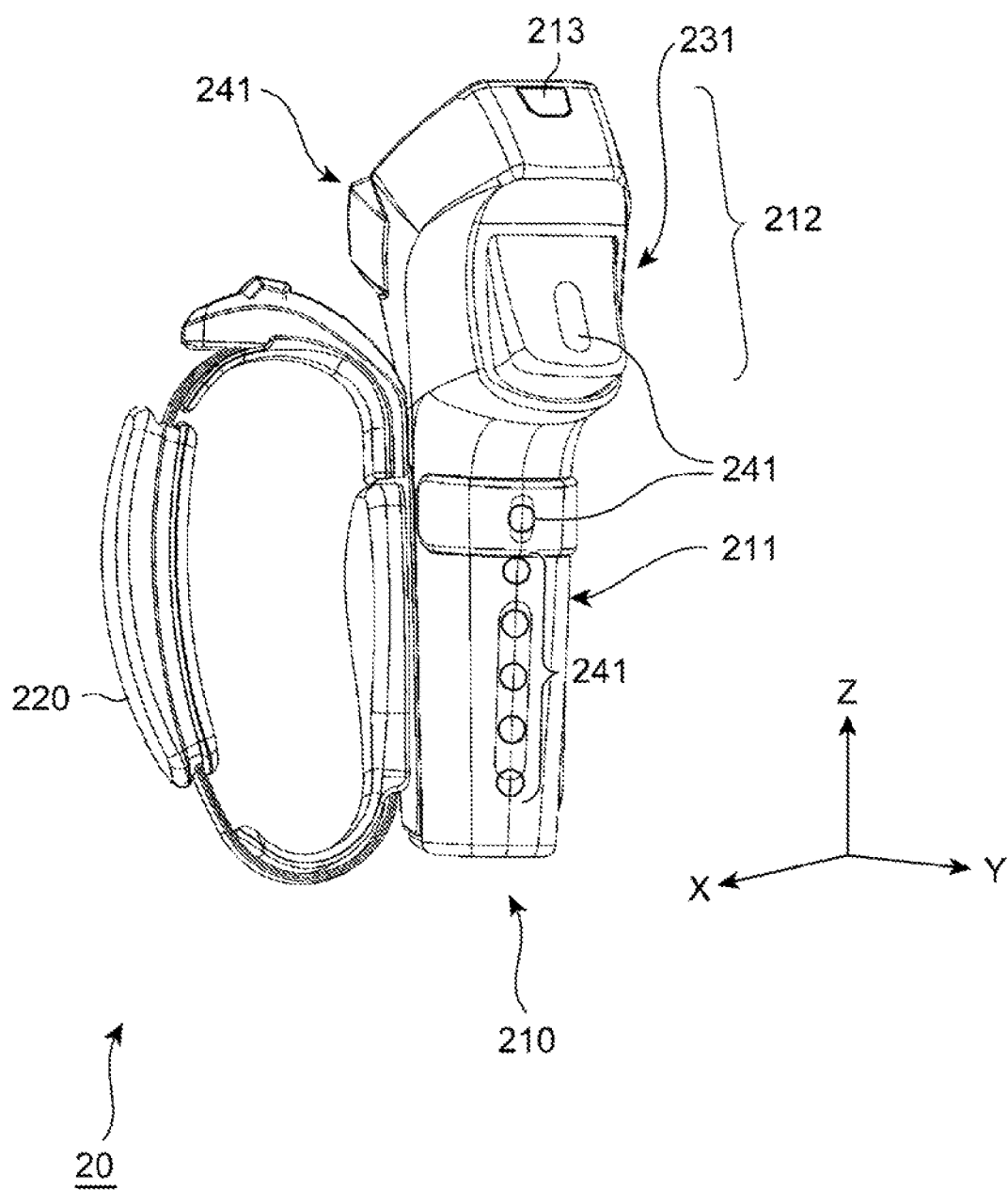
FIG. 1 is a schematic perspective diagram illustrating an example of a controller device connected to an information processing apparatus according to an embodiment of the present invention.
Figure 2:
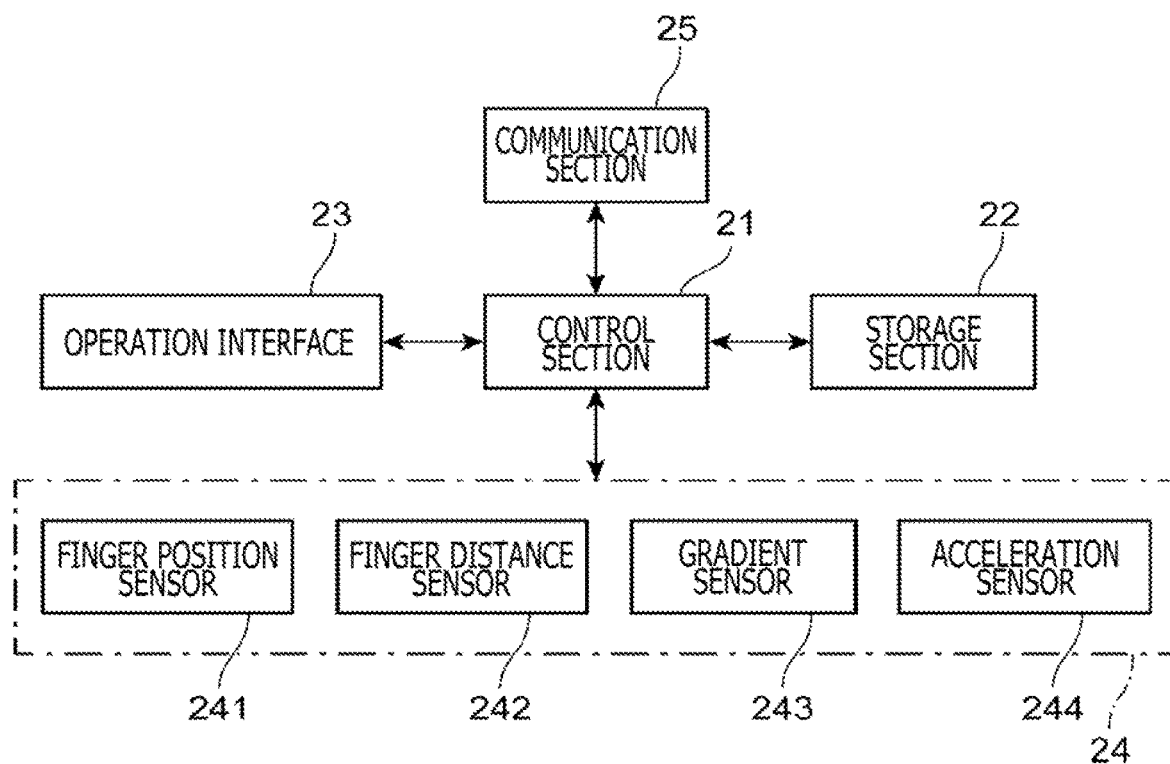
FIG. 2 is a block diagram illustrating a configuration example of the controller device connected to the information processing apparatus according to the embodiment of the present invention.

An outline of an example of the controller device 20 is exemplified in FIG. 1. The controller device 20 includes a device body 210 and a fixing tool 220 fixed to the device body 210. Further, as illustrated in FIG. 2, the controller device 20 includes a circuit section having a control section 21, a storage section 22, an operation interface 23, a sensor section 24, and a communication section 25 within the device body 210.

In the following description, a longitudinal direction of the device body 210 (direction of crossing the palm, when the device body 210 is fixed to a hand, with the side of the user's thumb being set as the positive direction) is set as a Z axis, a direction (depth direction) connecting a front side (near side when the palm is viewed with the device body 210 being fixed to the hand) and a back side is set as a Y axis, and a lateral direction (direction from the wrist side to the fingertip side when the device body 210 is fixed to the hand and the hand is opened (fingers are stretched)) is set as an X axis (FIG. 1).

The device body 210 of the controller device 20L to be mounted on the left hand of the user may be the same in shape as that of the controller device 20R to be mounted on the right hand of the user. In an example of the present embodiment, the fixing tool 220 is obtained by forming a belt having flexibility in a ring shape. The controller device 20 is used while fixed to a position at which, by passing the index finger, the middle finger, the ring finger and the little finger of the user through the fixing tool 220, the device body 210 is in contact with the base (position corresponding to the metacarpophalangeal (MP) joint of the index finger, the middle finger, the ring finger, and the little finger) of the thumb of the user.

Further, the size of the controller device 20 is set such that, when the user naturally grips the device body 210, one end thereof is positioned slightly outside a position the fingertip of the thumb of the user can reach and the other end thereof is positioned while slightly protruding from the base (position corresponding to the MP joint) of the little finger. Even if the user opens the hand while having the controller device 20 mounted thereon, the controller device 20 is fixed to the hand of the user by the fixing tool 220 and therefore it does not drop.

The device body 210 includes a gripping section 211 gripped by the user, an operation section 212, and a position presentation section 213. In the example of the present embodiment, the gripping section 211 substantially has a polygon column shape. The operation section 212 is continuously formed from the gripping section 211 and, in the example illustrated in FIG. 1, includes a button operation section 231 having a plurality of buttons capable of being operated by using the thumb of the user. When the user performs a depression operation onto one of the buttons, the button operation section 231 outputs information for specifying the button on which the depression operation is performed.

Further, on a side surface side (surface facing to the fingers when the back surface of the device body 210 is made contact with the palm of the user) of the device body 210, a finger position sensor 241 is provided in a manner corresponding to one or some of the index finger, the middle finger, the ring finger, and the little finger. In addition, on the side surface side of the device body 210, a finger distance sensor 242 may be provided in a manner corresponding to finger or fingers for which the corresponding finger position sensor 241 is not provided. The finger position sensor 241 and the finger distance sensor 242 will be described below.

Further, also in the button operation section 231, either of the finger position sensor 241 and the finger distance sensor 242 may be provided in a manner corresponding to the thumb of the user.

The position presentation section 213 is arranged on an upper side (the thumb side when fixed to the hand of the user) back surface of the device body 210 and, for example, includes at least one light emitting element such as a light emitting diode (LED). The position presentation section 213 is assumed to emit light of previously specified color peculiar to each controller device 20 while the controller device 20 is in operation. Further, it is only necessary that the position presentation section 213 is configured such that the positions of the respective controller devices 20 can be detected from the outside. Therefore, the position presentation section 213 can, for example, include a marker having a color peculiar to each controller device 20 and may not necessarily include a light emitting element.

In the example of the present embodiment, the finger position sensor 241 and the finger distance sensor 242 are optical sensors. When the user grips the device body 210, the finger position sensor 241 or the finger distance sensor 242 provided on the side surface side (surface facing to the fingers when the back surface of the device body 210 is made contact with the palm of the user) of the device body 210 is arranged at a position at which a position corresponding to the proximal phalanx of a corresponding finger is in contact with the finger position sensor 241 or the finger distance sensor 242.

Further, when the user puts a finger on a button of the button operation section 231, the finger position sensor 241 or finger distance sensor 242 provided on the button operation section 231 is arranged at a position to which a portion corresponding to the proximal phalanx of the thumb is closest.

In the finger position sensor 241, a normal direction on a surface of the finger position sensor 241 is used as a center, and an angle range of a relatively broad angle from the left side to the right side with respect to the center is set to a detectable range. The finger position sensor 241 detects a position of a corresponding finger in the detectable range and outputs information regarding the detection result. The finger position sensor 241 is not limited to a camera or an optical sensor, for example. As long as the position of a finger can be detected, any device may be used.

As an example, in the controller device 20R fixed to the right hand of the user, operations in a case where a depth camera (camera that projects infrared light in the detectable range and captures a reflected image of the infrared light in the detectable range) is provided as the finger position sensor 241 correspondingly to the index finger will be described. In the example, image data in which the detectable range is set to a field angle is captured and obtained by the finger position sensor 241.

Figure 3:
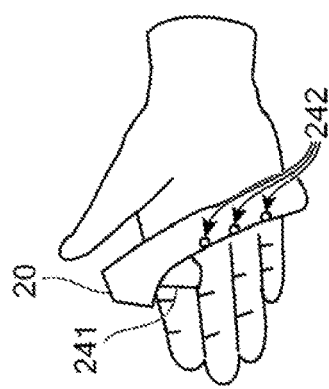
FIG. 3 is a description diagram illustrating content examples of processing of the information processing apparatus according to the embodiment of the present invention.
Figure 3:
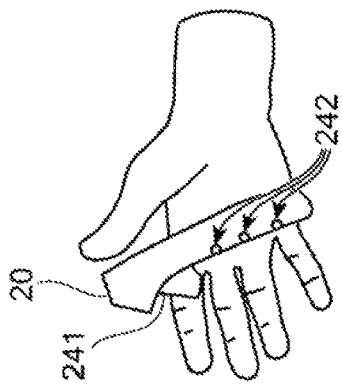
Figure 3:
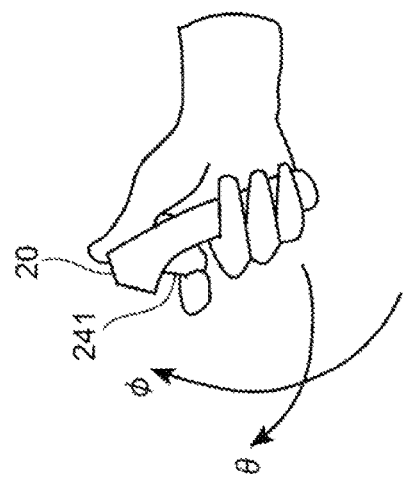
Figure 3:
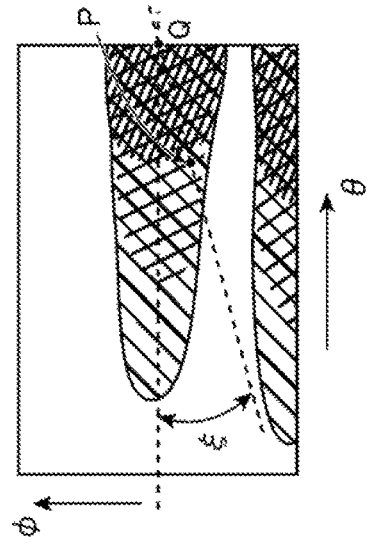
Figure 3:
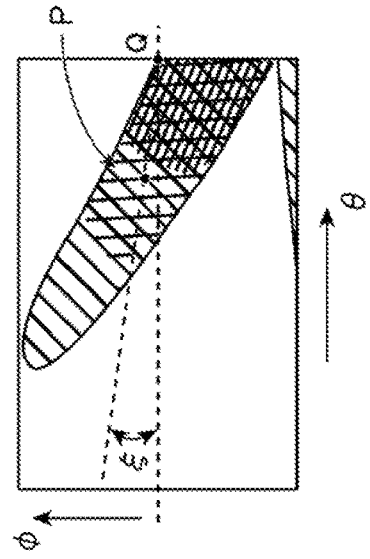
Figure 3:
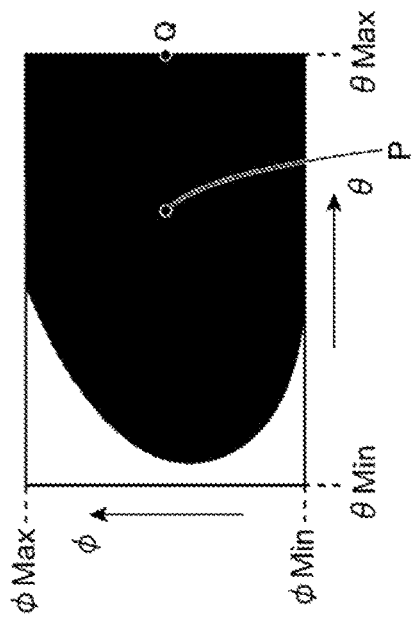

In the example, when the user bends the index finger of the right hand as exemplified in FIG. 3(a), the depth camera functioning as the finger position sensor 241 captures the image data in which the fingertip of the corresponding finger is totally captured as exemplified in FIG. 3(b). Note that, in FIG. 3, as exemplified in FIG. 3(a), a direction in which the fingertips move when the fingers are bent and stretched, namely, an angle direction in a plane orthogonal to the longitudinal direction of the device body 210 is set as a θ axis. Further, a direction in which the fingertips move when the fingers are opened and closed, namely, an angle direction in a plane parallel to the longitudinal direction of the device body 210 is set as a φ axis.

Further, when the user opens the fingers and stretches the index finger as exemplified in FIG. 3(c), in the image data captured by the finger position sensor 241, as exemplified in FIG. 3(d), the index finger is captured as an image that is on slightly the right side (on the finger side) in the direction of the θ axis and is stretched to the upper side of the φ axis (button operation section 231 side) and to the distant side (where the infrared light is weak) as tending toward the center (as an image in which the fingertip is directed in such direction).

Further, when the user closes the fingers and stretches the index finger as exemplified in FIG. 3(e), in the image data captured by the finger position sensor 241, as exemplified in FIG. 3(f), the index finger is captured as an image that is on slightly the right side (on the finger side) in the direction of the θ axis and is stretched in parallel to the θ axis to the distant side (where the infrared light is weak) as tending toward the center (as an image in which the fingertip is directed in such direction). Note that, in the states exemplified in FIGS. 3(c) to 3(f), part of the middle finger is also captured.

In the example of the present embodiment, the finger position sensor 241 may output the captured image data itself as the detection result. Alternatively, the finger position sensor 241 may output, as the detection result, a center-ofgravity position P (Pθ, Pφ) of an image of an object that exists at a position closer than a position of predetermined distance and a value such as an average or dispersion of the distance to the object.

The finger position sensor 241 corresponds to a finger position sensor that detects a direction of a fingertip according to the present invention.

Further, the finger distance sensor 242 has a light emitting section that radiates infrared light and a light receiving section that detects infrared light. The finger distance sensor 242 measures a rate at which light radiated from the light emitting section is reflected by the object and made incident into the light receiving section, thereby detecting the distance to an obstacle in the radiation direction of the infrared light. Specifically, here, the finger distance sensor 242 detects the distance to (an obstacle in the direction of) the corresponding finger. Then, the finger distance sensor 242 outputs information regarding the detected distance as information regarding the detection result.

In the example, the user fixes the device body 210 to the hand and moves the hand from a state in which the index finger, the middle finger, the ring finger, and the little finger are stretched to a form in which the device body 210 is gripped. At this time, in the state in which the corresponding finger is stretched, the finger distance sensor 242 detects the distance to an object in the fingertip direction of the finger (e.g., a floor face etc. if the user stretches the finger downwards). The distance has a sufficiently great value as compared to a distance at the time of detecting the finger and therefore the value is represented as "∞" in the following example.

Further, when the finger of the user is bent, the distance to the surface of the second joint or third joint of the corresponding bent finger is detected. In the state in which the user grips the device body 210, the surface of the corresponding finger is in contact with the finger distance sensor 242 and therefore the distance detected by the finger distance sensor 242 is "0." That is, the finger distance sensor 242 functions as a sensor that detects a bending/stretching state of the finger. Note that, the finger distance sensor 242 that detects the bending/stretching state of the finger is not limited to the optical sensor as described here as long as the bending/stretching (bent or stretched) state of each finger can be detected.

Further, the control section 21 is a program control device such as a control processing unit (CPU) and operates in accordance with programs stored in the storage section 22. In the present embodiment, the control section 21 receives an input of information indicating content of operations that are performed by the user on the operation section 212 through the operation interface 23 and outputs the information to the information processing apparatus 1 via the communication section 25. Further, the control section 21 outputs information output by a sensor included in the sensor section 24 to the information processing apparatus 1 via the communication section 25.

The storage section 22 is a memory device or the like and retains programs to be executed by the control section 21. The program may be stored in a computer-readable and non-transitory storage medium to be provided and duplicated into the storage section 22. Alternatively, the program may be provided via communication means such as a network and stored into the storage section 22. Further, the storage section 22 operates also as a work memory of the control section 21.

The operation interface 23 outputs information indicating content of operations that are performed by the user on the operation section 212 to the control section 21. The sensor section 24 includes at least one sensor and outputs information that is output by the sensor to the control section 21. In the example of the present embodiment, in addition to the already described finger position sensor 241 and finger distance sensor 242, the sensor section 24 may include a gradient sensor 243 that detects a gradient of the device body 210 of the controller device 20, and an acceleration sensor 244.

Here, the gradient sensor 243 detects information regarding an angle of the Z axis in the longitudinal direction of the device body 210 with respect to the direction of gravity and obtains information regarding an elevation/depression angle φ of the Z axis of the device body 210 from the horizontal plane through an arithmetic operation. Further, the gradient sensor 243 also detects information regarding a rotation angle θ around the Z axis and outputs detection result information including the rotation angle θ around the Z axis and the elevation/depression angle φ of the Z axis from the horizontal plane. The acceleration sensor 244 detects an acceleration in the X, Y, and Z axis directions of the controller device 20 and outputs detection result information indicating the detection result thereof. Further, the hand (including the fingers) that has the controller device 20 mounted thereon may hit against another object (the other hand, a hand of a stranger, a wall, or the like), thereby making an impact (when a time change of the acceleration is investigated, the acceleration grows like a pulse). In such a case, the acceleration sensor 244 detects the impact and outputs detection result information to the effect that the impact is detected.

The communication section 25 is a wired interface such as a universal serial bus (USB) interface or a wireless interface such as Bluetooth (registered trademark). The communication section 25 outputs various kinds of information to the information processing apparatus 1 in accordance with an instruction input from the control section 21.

Figure 4:
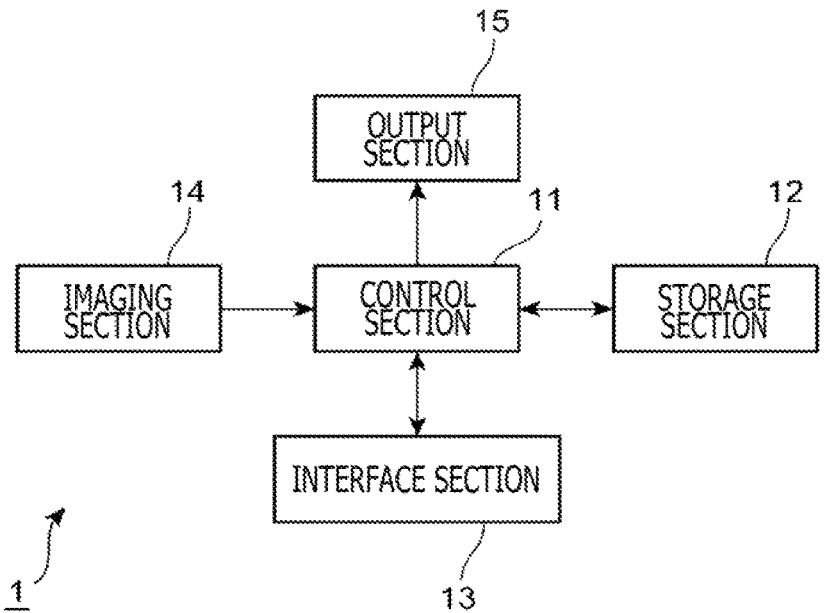
FIG. 4 is a block diagram illustrating a configuration example of the information processing apparatus according to the embodiment of the present invention.

As exemplified in FIG. 4, the information processing apparatus 1 includes a control section 11, a storage section 12, an interface section 13, an imaging section 14, and an output section 15. The control section 11 is a program control device such as a CPU and operates in accordance with programs stored in the storage section 12.

In the present embodiment, the control section 11 receives a detection result of an angle between one finger and an adjacent finger by the finger position sensor 241, a detection result by the finger distance sensor 242, or the like from the controller device 20. On the basis of the received detection results, the control section 11 estimates angles between the fingers of the user's hand and subjects information regarding the estimated angles between the fingers of the user's hand to predetermined processing. Detailed operations of the control section 11 will be described below.

The storage section 12 is a memory device, a disk device, or the like and retains programs executed by the control section 11. The programs may be stored in a computer readable and non-transitory recording medium to be provided and stored into the storage section 12. Alternatively, the programs may be provided via communication means such as a network and stored into the storage section 12. Further, the storage section 12 operates also as a work memory of the control section 11.

The interface section 13 is connected to the controller device 20 wirelessly or by wire. Further, the interface section 13 receives information indicating contents of an operation by the user, information detected by the finger position sensor 241, and information detected by the finger distance sensor 242 from the controller device 20 and outputs the information to the control section 11.

The imaging section 14 is a camera etc. installed while setting a range in which the user is positioned as an imaging range. Further, the imaging section 14 repeatedly captures an image including the user at each predetermined timing and outputs data of the image to the control section 11. The output section 15 has an interface that outputs a video etc. to a home television set, such as a high-definition multimedia interface (HDMI) (registered trademark) interface. The output section 15 outputs information regarding a video to be displayed in accordance with an instruction input from the control section 11.

Figure 5:
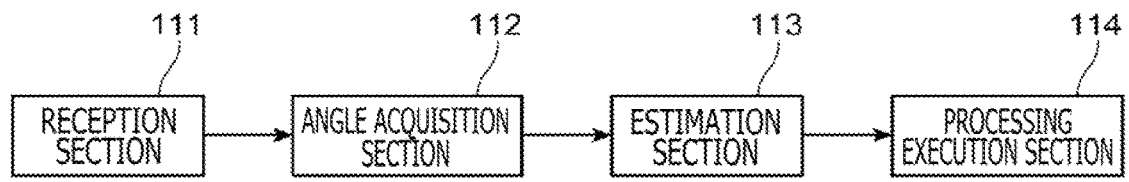
FIG. 5 is a functional block diagram illustrating an example of the information processing apparatus according to the embodiment of the present invention.

Next, operations of the control section 11 according to the present embodiment will be described. As exemplified in FIG. 5, the control section 11 according to the present embodiment functionally includes a reception section 111, an angle acquisition section 112, an estimation section 113, and a processing execution section 114.

Here, the reception section 111 receives information regarding detection results by the finger position sensor 241 or the finger distance sensor 242 or information regarding detection results of an angle of the hand from the controller device 20 at each predetermined timing (e.g., every time a certain time has elapsed). Further, when the controller device 20 detects an impact, the reception section 111 receives information to the effect that the impact has been detected.

On the basis of information regarding the detection results by the finger position sensor 241 provided in a manner corresponding to any one of the index finger, the middle finger, the ring finger, and the little finger, which information is received by the reception section 111, the angle acquisition section 112 acquires information regarding an angle between the finger corresponding to the finger position sensor 241 and a finger adjacent to the finger. Specifically, in a case where the finger position sensor 241 is a depth camera and outputs image data itself obtained by capturing an image as the detection results, the angle acquisition section 112 calculates the center-of-gravity position P of an image of the object that exists at a position closer than a position of predetermined distance on the basis of the captured image. Further, in the image data (image data of the field angle from θmin to θmax and from φmin to φmax) that is the detection result information of the finger position sensor 241, the angle acquisition section 112 defines, as a starting point Q, (θmax, (φmin++φmax)/2) or an average or the center of gravity of positions of pixels in which the fingers are captured among pixels in a single row of θmax. The angle acquisition section 112 calculates an angle ξ between a segment connecting the starting point Q and the previously calculated center-of-gravity position P and a virtual segment (segment parallel to the θ axis) in which φ is constant. Further, the angle acquisition section 112 outputs the angle value ξ as information regarding the angle between the corresponding finger and a finger adjacent to the finger.

Further, the controller device 20 may output, as the detection results, the center-of-gravity position P of the image of the object that exists at a position closer than a position of predetermined distance and a value such as an average or dispersion of the distance to the object on the basis of the output of the finger position sensor 241. In such a case, the angle acquisition section 112 defines, as the starting point Q, the position of (θmax, (φmin+φmax)/2) by using information (from θmin to θmax and from φmin to φmax) of the field angle of the captured image data. Then, the angle acquisition section 112 calculates the angle ξ between the segment connecting the starting point Q and the input center-of-gravity position P and the virtual segment (segment parallel to the θ axis) in which φ is constant. Further, the angle acquisition section 112 outputs the angle value ξ as information regarding the angle between the corresponding finger and a finger adjacent to the finger.

Note that, as described already, in the state in which the user stretches the fingers, an image of the fingers is captured on the side on which the fingers exist (the side on which the value of θ is great in the θ direction in a captured image in the controller device 20R mounted on the right hand, or the side on which the value of θ is small in the θ direction in a captured image in the controller device 20L mounted on the left hand). When a difference between Pθ and (θmin+θmax)/2 in the center-of-gravity position P (Pθ, Pφ) is smaller than a predetermined threshold value (the center-of-gravity position P is relatively positioned on the side opposite to the palm), the angle acquisition section 112 may consider that only the fingertips are captured and determine the angle to be "unknown." Further, not limited to this example, in a case where it can be determined that only the fingertips are captured such as a case where the area of an image of the captured finger is equal to or greater than a predetermined threshold value, the angle acquisition section 112 may determine the angle to be "unknown."

The estimation section 113 estimates an angle between the fingers of the user's hand on the basis of the angle value ξ calculated by the angle acquisition section 112. Specifically, in a case where information output by the angle acquisition section 112 is "unknown," the estimation section 113 does not output information regarding the angle.

By contrast, in a case where the value of the angle output by the angle acquisition section 112 is not "unknown" (in a case where the value is ξ), the estimation section 113 outputs the angle value ξ as information indicating an angle between the index finger and the middle finger, an angle between the middle finger and the ring finger, and an angle between the ring finger and the little finger.

Specifically, in an example of the present embodiment, the estimation section 113 uses information regarding an angle between any one of the index finger, the middle finger, the ring finger, and the little finger and a finger adjacent to the above finger to estimate that the information represents an angle between another finger of the index finger, the middle finger, the ring finger, and the little finger and a finger adjacent to the other finger.

The processing execution section 114 subjects the information regarding the angle between the fingers of the user's hand thus estimated to the predetermined processing. As an example, the processing execution section 114 determines whether the user stretches the fingers while closed (FIG. 3(e)) or the user stretches the fingers while opened (FIG. 3(c)). In game processing, the processing execution section 114 makes operations of characters controlled by the user different for the case where it is determined that the fingers are stretched while closed and the case where it is determined that the fingers are stretched while opened.

(Operations)

The information processing system according to the present embodiment basically has the above configuration and operates as follows. In the following example, on the controller device 20, a depth camera is assumed to be provided as the finger position sensor 241 corresponding to the index finger and the finger distance sensor 242 is assumed to be provided in a manner corresponding to each of the middle finger, ring finger, and little finger for which the finger position sensor 241 is not provided.

When the user fixes the respective controller devices 20 to the left hand and the right hand and starts up the controller devices 20 and the information processing apparatus 1, the finger position sensor 241 corresponding to the index finger captures image data in a predetermined detectable range at each predetermined timing (e.g., every time a certain time has elapsed).

Here, if the user stretches, for example, the index finger, middle finger, ring finger, and little finger of the right hand while closed (FIG. 3(e)), the finger position sensor 241 captures image data exemplified in FIG. 3(f). From the captured image data, the controller device 20 calculates the center-of-gravity position P of the image of the object that exists (in a range in which luminance of a pixel value is greater than a threshold value) at a position closer than a position of predetermined distance and a value such as an average or dispersion of the distance to the object on the basis of the output of the finger position sensor 241.

Then, the controller device 20 outputs, as the detection result of the finger position sensor 241, the calculated center-of-gravity position P and the value such as an average or dispersion of the distance to the object. Further, the controller device 20 outputs information regarding the detection result of the finger distance sensor 242 and information regarding the detection result of an angle of the hand.

Figure 6:
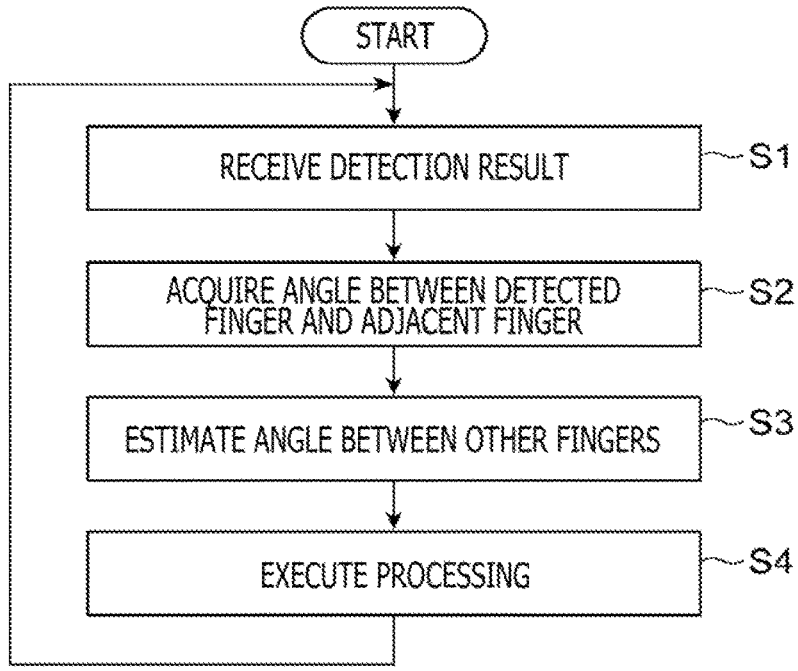
FIG. 6 is a flowchart illustrating an operation example of the information processing apparatus according to the embodiment of the present invention.

As exemplified in FIG. 6, the information processing apparatus 1 receives information regarding the detection result of the finger position sensor 241 and the finger distance sensor 242 or information regarding the detection result of an angle of the hand from the controller device 20 at each predetermined timing (S1).

Note that the information processing apparatus 1 uses the information regarding the field angle (from θmin to θmax and from φmin to φmax) of the image data captured by the finger position sensor 241 of the controller device 20 and calculates a position of (θmax, (φmin+φmax)/2) as the starting point Q.

The information processing apparatus 1 calculates the angle ξ between a segment connecting coordinates (Pθ, Pφ) of the center-of-gravity position P of the image of the object, which is received from the controller device 20, and the starting point Q and the virtual segment (segment parallel to the θ axis) in which φ is constant, and determines the angle value ξ as a value of an angle between the corresponding index finger and the middle finger adjacent to the index finger (S2).

Here, the angle ξ between a segment connecting P and Q exemplified in FIG. 3(f) and the virtual segment (segment parallel to the θ axis) in which φ is constant is approximately 0 degrees.

The information processing apparatus 1 estimates that also the angle between the middle finger and the ring finger and the angle between the ring finger and the little finger each have the value ξ (here, 0 degrees) by using the thus calculated angle value ξ between the index finger and the middle finger (S3).

Then, the information processing apparatus 1 executes the process in consideration of the state in which the fingers of the right hand of the user are stretched while closed on the basis of the value estimated in the process S3 (S4). The information processing apparatus 1 repeatedly executes the processes S1 to S4.

Next, if the user opens the fingers, for example, in the state in which the index finger, middle finger, ring finger, and little finger of the right hand are stretched (in the case exemplified in FIG. 3(c)), the finger position sensor 241 captures the image data exemplified in FIG. 3(d). From the captured image data, the controller device 20 calculates the center-of-gravity position P of the image of the object that exists (in the range in which luminance of the pixel value is greater than the threshold value) at a position closer than a position of predetermined distance and a value such as an average or dispersion of the distance to the object on the basis of an output of the finger position sensor 241.

Then, the controller device 20 outputs the calculated center-of-gravity position P and the value such as an average or dispersion of the distance to the object as the detection result of the finger position sensor 241. Further, the controller device 20 outputs the information regarding the detection result of the finger distance sensor 242 and information regarding the detection result of an angle of the hand.

At this time, in the process S1 exemplified in FIG. 6, the information processing apparatus 1 receives the information regarding the detection results of the finger position sensor 241 and the finger distance sensor 242, or the information regarding the detection result of an angle of the hand from the controller device 20. Then, in the process S2, the information processing apparatus 1 calculates the angle ξ between the segment connecting the coordinates (Pθ, Pφ) of the center-of-gravity position P of the image of the object, which is received from the controller device 20, and the previously calculated starting point Q and the virtual segment (segment parallel to the θ axis) in which φ is constant, and determines the angle value ξ as a value of an angle between the corresponding index finger and the middle finger adjacent to the index finger.

Here, the angle ξ between the segment connecting P and Q exemplified in FIG. 3(d) and the virtual segment (segment parallel to the θ axis) in which φ is constant is greater than 0, for example, 15 degrees.

In the process S3, the information processing apparatus 1 estimates that also the angle between the middle finger and the ring finger and the angle between the ring finger and the little finger each have the value ξ (here, 15 degrees) by using the thus calculated angle value ξ between the index finger and the middle finger.

Then, in the process S4, the information processing apparatus 1 executes the process in consideration of the state in which the fingers of the right hand of the user are stretched while opened on the basis of the value estimated in the process S3.

(Another Example in Terms of Middle Finger and Ring Finger)

Note that, thinking of the fingers of a person, a movable range of the middle finger or the ring finger is generally narrow as compared to that of the index finger or the little finger. Therefore, when a direction of the fingertip of the middle finger or the ring finger (angle ξ between the finger and the adjacent finger) is estimated on the basis of the process described above, the estimated value may be smaller than an actual value.

To solve the above problem, in one example of the present embodiment, the information processing apparatus 1 does not directly set the angle ξ calculated on the basis of the detection result of the finger position sensor 241 corresponding to the middle finger or the ring finger as an angle between the middle finger or the ring finger and the adjacent finger. Further, the information processing apparatus 1 multiplies the angle ξ by a predetermined correction value (positive value greater than one) α and estimates that the angle between the corresponding finger and a finger adjacent to the finger is α×ξ.

In this case, the information processing apparatus 1 estimates that an angle between the other fingers (the angle between the index finger and the middle finger, the angle between the ring finger and the little finger, or the like) is also the estimated angle α×ξ. Note that the correction value α may be set differently in each angle between the fingers (the angle between the index finger and the middle finger, the angle between the middle finger and the little finger, and the angle between the ring finger and the little finger, respectively).

(Example Using Information from Finger Distance Sensor)

Further, in the present embodiment, the information regarding the detection result of the finger distance sensor 242 may be used as well and a pose of the hand of the user may be estimated. In the example, the estimation section 113 uses the angle value ξ output by the angle acquisition section 112 and the information regarding the detection result of the finger distance sensor 242 received by the reception section 111 and estimates the pose of the hand of the user as follows.

Hereinafter, as an example, the finger position sensor 241 is assumed to be provided in a manner corresponding to the index finger and the finger distance sensor 242 is assumed to be provided in a manner corresponding to each of the middle finger, the ring finger, and the little finger. At this time, when the user stretches the index finger, the middle finger, the ring finger, and the little finger while opened as exemplified in FIG. 7(a), the angle value ξ is a value greater than "0" (e.g., 15 degrees). Further, the finger distance sensors 242 corresponding to the middle finger, the ring finger, and the little finger are not able to detect the fingers and each detect a distance to a floor face, a wall, etc. in the direction of the fingertip (the distance is sufficiently great as compared to a case where the fingers are detected as described already and therefore the value is conveniently represented as "∞") (FIG. 7(b)).

In this case, the estimation section 113 of the control section 11 of the information processing apparatus 1 estimates that all the fingers are stretched and the angle between the index finger and the middle finger is ξ. Then, the estimation section 113 outputs the angle value ξ as information indicating the angle between the index finger and the middle finger, the angle between the middle finger and the ring finger, and the angle between the ring finger and the little finger.

Figure 7:
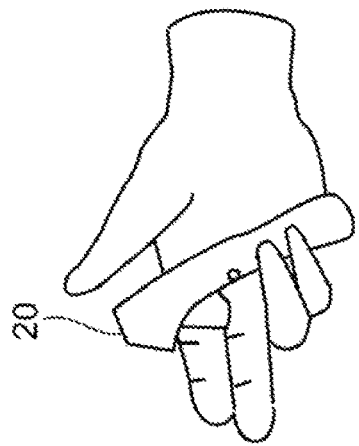
FIG. 7 is a description diagram illustrating content examples of another piece of processing of the information processing apparatus according to the embodiment of the present invention.
Figure 7:
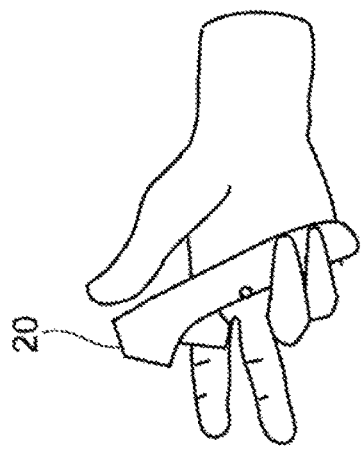
Figure 7:
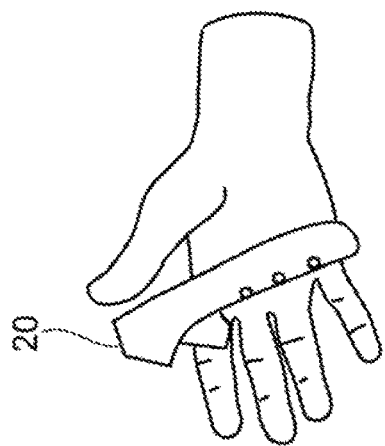

By contrast, when the user stretches the index finger and the middle finger while opened and bends the ring finger and the little finger (namely, in the scissors state at rock-paper-scissors) as exemplified in FIG. 7(c), the angle value ξ is a value greater than "0" (e.g., 15 degrees). Further, the finger distance sensors 242 corresponding to the ring finger and the little finger detect the fingers in contact with the controller device 20 and therefore detect "0" as the distances to the ring finger and the little finger (FIG. 7(d)).

At this time, the estimation section 113 of the control section 11 estimates that the angle between the index finger and the middle finger is ξ. Further, the estimation section 113 estimates that information indicating the angle between the middle finger and the ring finger and the angle between the ring finger and the little finger is "indefinite."

Further, when the user stretches the index finger and the middle finger while closed and bends the ring finger and the little finger as exemplified in FIG. 7(e), the angle value ξ is "0." Further, the finger distance sensors 242 corresponding to the ring finger and the little finger each detect the finger in contact with the controller device 20 and therefore detect "0" as the distances up to the ring finger and the little finger (FIG. 7(f)).

At this time, the estimation section 113 of the control section 11 estimates that the angle between the index finger and the middle finger is ξ=0. Further, the estimation section 113 estimates that the information indicating the angle between the middle finger and the ring finger and the angle between the ring finger and the little finger is "indefinite."

As described above, it is a natural attitude that when the index finger and the middle finger are opened, the other fingers are opened and when the index finger and the middle finger are closed (the index finger and the middle finger are aligned), the other fingers are also closed. The present embodiment focuses on the above fact and estimates that the angle between the middle finger and the ring finger and the angle between the ring finger and the little finger are substantially equal to the angle ξ between the index finger and the middle finger. Therefore, according to the present embodiment, by providing a sensor that detects an angle between any one of the index finger, the middle finger, the ring finger, and the little finger and a finger adjacent to the finger, a sensor that detects an angle between the other fingers can be omitted and an increase in costs can be suppressed.

MODIFICATION EXAMPLES

Further, in the description so far according to the present embodiment, the processes as the reception section 111, the angle acquisition section 112, and the estimation section 113 are executed by the control section 11 of the information processing apparatus 1; however, the present embodiment is not limited thereto.

Specifically, in an example of the present embodiment, the control section 21 of the controller device 20 may acquire, on the basis of a direction of the fingertip of any one of the index finger, middle finger, ring finger, and little finger detected by the finger position sensor, information regarding an angle between the finger and a finger adjacent to the finger. Further, the control section 21 may estimate angles between respective fingers of the index finger, middle finger, ring finger, and little finger of the user's hand on the basis of a result of the acquisition. In addition, the control section 21 may send out information regarding the estimated angles between the respective fingers of the user's hand to the information processing apparatus 1 and subject the information to predetermined processing.

In this case, the control section 21 may also execute processing in which the angle ξ calculated on the basis of the detection result of the finger position sensor 241 corresponding to the middle finger or the ring finger is not directly set to an angle between the middle finger or the ring finger and the adjacent finger, and the angle ξ is multiplied by the predetermined correction value (positive value greater than one) α and the angle between the corresponding finger and a finger adjacent to the finger is estimated to be α×ξ.

Further, the control section 21 may also execute processing in which the information regarding the detection result of the finger distance sensor 242 is used as well and the pose of the user's hand is estimated.

REFERENCE SIGNS LIST

1 Information processing apparatus, 11 Control section, 12 Storage section, 13 Interface section, 14 Imaging section, 15 Output section, 20 Controller device, 21 Control section, 22 Storage section, 23 Operation interface, 24 Sensor section, 25 Communication section, 111 Reception section, 112 Angle acquisition section, 113 Estimation section, 114 Processing execution section, 210 Device body, 211 Gripping section, 212 Operation section, 213 Position presentation section, 220 Fixing tool, 231 Button operation section, 241 Finger position sensor, 242 Finger distance sensor, 243 Gradient sensor, 244 Acceleration sensor

The invention claimed is:

1. An information processing system including a device fixed to a hand of a user, comprising:
a finger position sensor configured to detect a direction of a fingertip regarding one of an index finger, a middle finger, a ring finger, and a little finger of the hand of the user;
acquisition means configured to acquire, on a basis of the direction of the fingertip regarding the one of the index finger, the middle finger, the ring finger, and the little finger detected by the finger position sensor, information regarding an angle between the finger and a finger adjacent to the finger; and
estimation means configured to estimate, on a basis of a result of the acquisition, an angle between respective fingers of the index finger, the middle finger, the ring finger, and the little finger of the hand of the user, wherein
information regarding the estimated angle between the respective fingers of the hand of the user is subjected to predetermined processing.

2. An information processing apparatus connected to a device fixed to a hand of a user, the device including a finger position sensor configured to detect a direction of a fingertip regarding one of an index finger, a middle finger, a ring finger, and a little finger of the hand of the user, the information processing apparatus comprising:
acquisition means configured to acquire, on a basis of the direction of the fingertip regarding the one of the index finger, the middle finger, the ring finger, and the little finger detected by the finger position sensor and received from the device, information regarding an angle between the finger and a finger adjacent to the finger; and
estimation means configured to estimate, on a basis of a result of the acquisition, an angle between respective fingers of the index finger, the middle finger, the ring finger, and the little finger of the hand of the user, wherein
the information processing apparatus subjects information regarding the estimated angle between the respective fingers of the hand of the user to predetermined processing.

3. The information processing apparatus according to claim 2, wherein the finger position sensor is a finger position sensor that detects the direction of the fingertip of the index finger,
the acquisition means of the information processing apparatus acquires, on the basis of the direction of the fingertip of the index finger detected by the finger position sensor and received from the device, information regarding an angle between the index finger and the middle finger adjacent to the index finger, and the estimation means estimates, on a basis of a result of the acquisition, an angle between the middle finger and the ring finger and an angle between the ring finger and the little finger of the hand of the user.

4. A control method using a computer connected to a device fixed to a hand of a user and including a finger position sensor configured to detect a direction of a fingertip regarding one of an index finger, a middle finger, a ring finger, and a little finger of the hand of the user, the control method comprising:
by acquisition means, acquiring, on a basis of the direction of the fingertip regarding the one of the index finger, the middle finger, the ring finger, and the little finger detected by the finger position sensor and received from the device, information regarding an angle between the finger and a finger adjacent to the finger; and
by estimation means, estimating, on a basis of a result of the acquisition, an angle between respective fingers of the index finger, the middle finger, the ring finger, and the little finger of the hand of the user.

5. A program for a computer connected to a device fixed to a hand of a user and including a finger position sensor configured to detect a direction of a fingertip regarding one of an index finger, a middle finger, a ring finger, and a little finger of the hand of the user, the program comprising:
by acquisition means acquiring, on a basis of the direction of the fingertip regarding the one of the index finger, the middle finger, the ring finger, and the little finger detected by the finger position sensor and received from the device, information regarding an angle between the finger and a finger adjacent to the finger; and
by estimation means, estimating, on a basis of a result of the acquisition, an angle between respective fingers of the index finger, the middle finger, the ring finger, and the little finger of the hand of the user.

6. A computer-readable recording medium that stores a program for a computer connected to a device fixed to a hand of a user and including a finger position sensor configured to detect a direction of a fingertip regarding one of an index finger, a middle finger, a ring finger, and a little finger of the hand of the user, the program comprising:
by acquisition means, acquiring, on a basis of the direction of the fingertip regarding the one of the index finger, the middle finger, the ring finger, and the little finger detected by the finger position sensor and received from the device, information regarding an angle between the finger and a finger adjacent to the finger; and
by estimation means, estimating, on a basis of a result of the acquisition, an angle between respective fingers of the index finger, the middle finger, the ring finger, and the little finger of the hand of the user.

* * * * *